United States Patent
Snelling

(10) Patent No.: US 6,615,658 B2
(45) Date of Patent: Sep. 9, 2003

(54) METHOD AND APPARATUS FOR DETECTING THE INTERNAL LIQUID LEVEL IN A VESSEL

(76) Inventor: Charles Darwin Snelling, 711 Hamilton Mall, Allentown, PA (US) 18101-2407

(*) Notice: Subject to any disclaimer, the term of this patent is extended or adjusted under 35 U.S.C. 154(b) by 0 days.

(21) Appl. No.: 09/800,259

(22) Filed: Mar. 6, 2001

(65) Prior Publication Data

US 2001/0035827 A1 Nov. 1, 2001

Related U.S. Application Data

(63) Continuation-in-part of application No. 09/368,337, filed on Aug. 3, 1999.

(51) Int. Cl.[7] .......................... G02F 23/27; G07N 25/56; G08B 21/00

(52) U.S. Cl. ............................ 73/295; 374/54; 340/622

(58) Field of Search ............................... 73/290 R, 295, 73/204, 110; 374/16, 45, 54; 340/622

(56) References Cited

U.S. PATENT DOCUMENTS

| | | | |
|---|---|---|---|
| 3,161,050 A | 12/1964 | Exner | 73/295 |
| 3,461,446 A | 8/1969 | Sergeant | 340/244 |
| 3,485,100 A | * 12/1969 | Petersen | 338/23 |
| 3,696,675 A | 10/1972 | Gilmour | 73/295 |
| 4,036,053 A | 7/1977 | Jenkins | 73/204 |
| 4,065,967 A | 1/1978 | Beeston | 73/295 |
| 4,089,209 A | 5/1978 | Grana et al. | 73/61 R |
| 4,135,186 A | 1/1979 | Minorikawa et al. | 340/622 |
| 4,248,087 A | 2/1981 | Dennis et al. | 73/290 V |

(List continued on next page.)

FOREIGN PATENT DOCUMENTS

JP 010543140 A * 3/1989 .................. 374/54

OTHER PUBLICATIONS

"Accu–Level® Propane Tank Gauge", Hammerhead Tower, Inc., 1988–1996, 1 page.

U.S. patent application No. 09/080,689 filed May 18, 1998, abandoned Jul. 7, 1999.

*Primary Examiner*—Edward Lefkowitz
*Assistant Examiner*—Michael Cygan

(57) ABSTRACT

A system for detecting the level of a liquid in a vessel, comprises a detector assembly including a thermally conductive substrate supported within the vessel. One or more heaters are mounted on the substrate within the vessel. One or more temperature sensors, each associated with a respective heater, are mounted on the substrate. The sensor(s) may be actuated to generate an electrical signal defining a temperature signal indicative of the detected temperature. A processor is electrically connected to the sensor(s) for receiving the temperature signal(s) after actuation of the associated heater(s). The processor is programmed to calculate a "temperature index" proportional to the temperature signal(s). The temperature index(s) indicates the temperature increase detected by the sensor(s) resulting from actuation of the heater(s). This, in turn, indicates the presence of liquid or vapor adjacent to the sensor(s). The processor is programmed further to compare the temperature index(s) to a "reference" and to generate an electrical signal(s) defining an elevation signal indicative of the presence of liquid or vapor. The processor is electrically connected to an interface for communicating to a user the elevation of the upper surface of the liquid in the vessel. The aforementioned system is operated according to a method for detecting the level of liquid in the vessel.

12 Claims, 3 Drawing Sheets

U.S. PATENT DOCUMENTS

| | | | | |
|---|---|---|---|---|
| 4,326,199 A | * | 4/1982 | Tarpley et al. | 137/386 |
| 4,358,955 A | | 11/1982 | Rait | 73/295 |
| 4,425,795 A | * | 1/1984 | Albrecht et al. | 702/53 |
| 4,466,282 A | * | 8/1984 | Kuhnel | 73/295 |
| 4,513,616 A | | 4/1985 | Bezard et al. | 73/295 |
| 4,532,799 A | * | 8/1985 | O'Neill | 340/622 |
| 4,590,797 A | | 5/1986 | Beaubatie et al. | 73/295 |
| 4,609,913 A | | 9/1986 | Arbogast et al. | 340/622 |
| 4,665,385 A | | 5/1987 | Henderson | 340/539 |
| 4,720,997 A | | 1/1988 | Doak et al. | 23/295 |
| 4,774,838 A | | 10/1988 | Rickson et al. | 73/295 |
| 4,796,471 A | | 1/1989 | Sabin | 73/295 |
| 4,845,486 A | | 7/1989 | Knight et al. | 340/618 |
| 4,901,061 A | * | 2/1990 | Twerdochlib | 340/501 |
| 5,023,806 A | | 6/1991 | Patel | 364/509 |
| 5,092,170 A | | 3/1992 | Hønstvet et al. | 73/295 |
| 5,167,154 A | | 12/1992 | Lee | 73/295 |
| 5,174,153 A | | 12/1992 | Nakano | 73/295 |
| 5,209,115 A | | 5/1993 | Bond | 73/295 |
| 5,234,527 A | * | 8/1993 | Nozawa et al. | 118/663 |
| 5,297,393 A | | 3/1994 | Thompson | 62/129 |
| 5,323,652 A | | 6/1994 | Parker | 73/295 |
| 5,615,573 A | * | 4/1997 | Lee | 374/54 |
| 5,671,603 A | * | 9/1997 | McCorkle et al. | 137/392 |
| 5,719,332 A | * | 2/1998 | Wallrafen | 340/622 |
| 5,730,026 A | | 3/1998 | Maatuk | 73/295 |
| 5,782,131 A | * | 7/1998 | Lord et al. | 374/54 |
| 5,798,698 A | * | 8/1998 | Politt et al. | 340/618 |
| 5,908,985 A | | 6/1999 | Maatuk | 73/295 |

\* cited by examiner

METHOD AND APPARATUS FOR DETECTING THE INTERNAL LIQUID LEVEL IN A VESSEL

This application is a Continuation-In-Part application of U.S. patent application Ser. No. 09/368,337, filed Aug. 3, 1999, the entire disclosure of which is hereby incorporated by reference herein.

BACKGROUND OF THE INVENTION

The present invention relates generally to liquid level detection systems and, more particularly, to an internal liquid level detector system for mounting within a vessel for measuring the volume of liquid within the vessel and a method for operating such a system.

Conventional storage vessels, such as propane tanks, are beneficial both for their mobility and for their suitability to the energy needs of remote locations where access to other forms of energy is often unavailable or costly. It is desirable to be able to detect the volume of liquid in such a vessel at any specific time so as to schedule re-supply (sometimes referred to as re-charging) of the tank thereby to prevent emptying of the vessel (sometimes referred to as "running dry").

Sensors for measuring the elevation of the upper surface of liquid contained in a vessel are known. In operation, such a sensor generates an electrical signal indicative of the quantity of liquid in the vessel. The signal is transmitted to an interface located externally of the vessel which communicates to a user the quantity of liquid in the vessel.

One such type of internal sensor is a float-type gauge. Such a gauge normally has limited accuracy because it contains moving parts such as the float and associated linkage for sensing vertical displacement of the float as the upper surface of the liquid rises and falls. With movement comes associated friction to which the moving parts are subjected thereby causing wear to the gauge and eventual degradation. Additionally, a float-type gauge includes fragile portions, such as the linkage connected to the float which must be sufficiently delicate to translate vertical displacement of the float to the stationary base of the gauge for measuring the displacement. The fragility of the moving parts makes them susceptible to damage.

Alternatively, a computer may be used to estimate the level, i.e., elevation, of the liquid in a vessel relative to the interior bottom surface of the vessel. In particular, specially designed software may be used to monitor usage and predict when refill or recharging is necessary. Previous liquid usage patterns are considered, as well as weather and other data. While of some use, computers have been found to have limited reliability in predicting the amount of liquid in the vessel at a specific time and, in particular, the time when the vessel will become completely empty if not recharged. Such prediction may be especially difficult when the usage patterns are variable.

SUMMARY OF THE INVENTION

The internal liquid level detector system of the present invention detects the level of a liquid in a vessel. The system comprises a detector assembly including a thermally conductive substrate supported within the vessel. One or more heaters (referred to herein as "heater(s)") are mounted on the substrate within the vessel such that the heater(s) are thermally coupled to the interior of the vessel. The heater(s) may be actuated to add heat to the surface of the substrate thermally coupled to the interior of the vessel. If multiple heaters are mounted on the substrate, the heaters are located thereon such that, when the substrate is supported in the vessel, the heaters have different elevations.

One or more sensors (referred to herein as "sensor(s)") are mounted on the substrate in proximity to the heater(s). The sensor(s) are thermally coupled to the interior of the vessel to detect the temperature(s) therein in proximity to the sensor(s). The sensor(s) may be actuated to generate an electrical signal defining a temperature signal(s) indicative of the detected temperature(s). If multiple sensors are mounted on the substrate, the sensor(s) are located thereon such that, when the substrate is supported in the vessel, the elevation of each sensor corresponds to the elevation of a respective one of the heaters.

A processor is electrically connected to the sensor(s) for receiving the temperature signal after actuation of the associated heater(s). The processor is programmed to calculate a "temperature index" proportional to the temperature signal (s). The temperature index(s) indicates the temperature increase(s) detected by the sensor(s) resulting from actuation of the heater(s). This, in turn, indicates the presence of liquid or vapor adjacent to the sensor(s) because the presence of liquid results in a lower temperature increase as compared to the temperature increase if vapor is present.

The processor is programmed further to compare the temperature index(s) to a "reference" and to generate an electrical signal(s) defining an elevation signal(s) indicative of the elevation of the upper surface of the liquid being either above or below the sensor(s).

The processor is electrically connected to an interface for communicating to a user the elevation of the upper surface of the liquid in the vessel. The aforementioned system is operated according to a method for detecting the level of liquid in the vessel.

The system of the present invention provides for the heater(s) and sensor(s) to be within the vessel. Accordingly, the heat transfer between the heater(s), liquid and/or vapor within the vessel, and sensor(s) need not be through the exterior wall of the vessel. Heat transfer through the wall of the vessel is typically of limited efficiency because of the substantial thickness of the vessel normally required if the contents of the tank are pressurized. In contrast, if the substrate of the present invention is a tube, such a tube may have a considerably smaller outer diameter (e.g., less than ¼" to ¾") and can be made with thin walls because it is inherently stronger due to its geometry. This results in a reduction in the required output of the heater allowing for a reduction in the amount of energy required resulting in a lower wattage.

Moreover, providing the heater(s) and sensor(s) within the vessel provides a more intimate thermal coupling between the liquid and vapor in the vessel, and the heater(s) and sensor(s) thereby increasing the accuracy of the system. The thermal coupling is facilitated by the heater(s) and sensor(s) being surrounded by the liquid and vapor in the vessel. In contrast, locating the heater and sensor on the outer surface of the vessel results in portions of the heater and sensor facing away from the liquid and vapor in the vessel thereby proving possible paths for diversion of the heat transfer between the heater and sensor, and the liquid and vapor. Moreover, the substrate may be a tube having a relatively small outer diameter and thin wall thickness which improves the thermal coupling with the interior contents of the vessel.

Additionally, locating the heater(s) and sensor(s) on the outer surface of the vessel requires the heat transfer between such heater(s) and sensor(s), and the liquid and vapor in the vessel, to be through the relatively thick wall of the vessel. The increased thickness of the wall of the vessel is typically needed because the vessel must have sufficient strength to contain the contents within the vessel which are often under high pressure. The increased thickness of the vessel wall normally complicates the temperature detections by the sensor and the resultant determinations by the processor because the heat transfer through the thicker wall of the vessel is more complex. This complexity results, e.g., from a portion of the energy of the heater (located outside the vessel) being absorbed and distributed by the vessel wall rather than by the contents of the vessel. This requires the processor to interpret a reduced and less distinct signal from the sensor.

Furthermore, providing the heater(s) and sensor(s) within the vessel enables the substrate, e.g., a tube, to be a linear structure. In contrast, if the substrate is mounted on the outer surface of the vessel, which frequently is curved, the substrate is preferably shaped to conform to the curvature of the outer surface to enable close adjacency between the heater and sensor and the vessel. A curved substrate matching the curvature of the outer surface of the vessel introduces further complexity into the structure of the substrate. This curvature may be substantial if the components are separated by substantial distances. Such separation, especially vertically, may be necessary for the system to provide detection of a substantial range of liquid levels. While this may appear to be remedied by dispensing with the substrate entirely (and mounting the heater and sensor directly to the vessel), the substrate is desirable for a heater and sensor attached to the outer surface of the vessel because the substrate advantageously provides modularity. Such modularity facilitates handling of the heater and sensor by a single structure and provides protection to the components.

The system of the present invention does not encompass any moving parts within the vessel thereby eliminating any associated mechanical friction and ensuring durability, longevity and ruggedness. The absence of moving parts also increases accuracy and reproducibility. Additionally, the heater(s) and sensor(s) may be contained within a non-deformable enclosure, such as a tube, which provides a complete barrier to direct contact between the heater(s) and sensor(s) and the environment within the vessel. Such an enclosure may be contained within a perforated, non-deformable second enclosure, such as a second tube, for protective shielding from the environment within the vessel.

The substrate of the present invention provides for the heater(s) and sensor(s) to be included as multiple components within a single modular component. This facilitates installation in a tank, especially if the tank is buried, because only a single assembly is required to be inserted, e.g., from above by lowering into the tank. This modularity also facilitates the durability and reliability of the system.

These and other features and advantages of the invention will be more fully understood from the following description of specific embodiments of the invention taken together with the accompanying drawings.

BRIEF DESCRIPTION OF THE DRAWINGS

In the drawings.

Corresponding reference characters indicate corresponding parts throughout the several views of the drawings.

DETAILED DESCRIPTION

Figure 2:
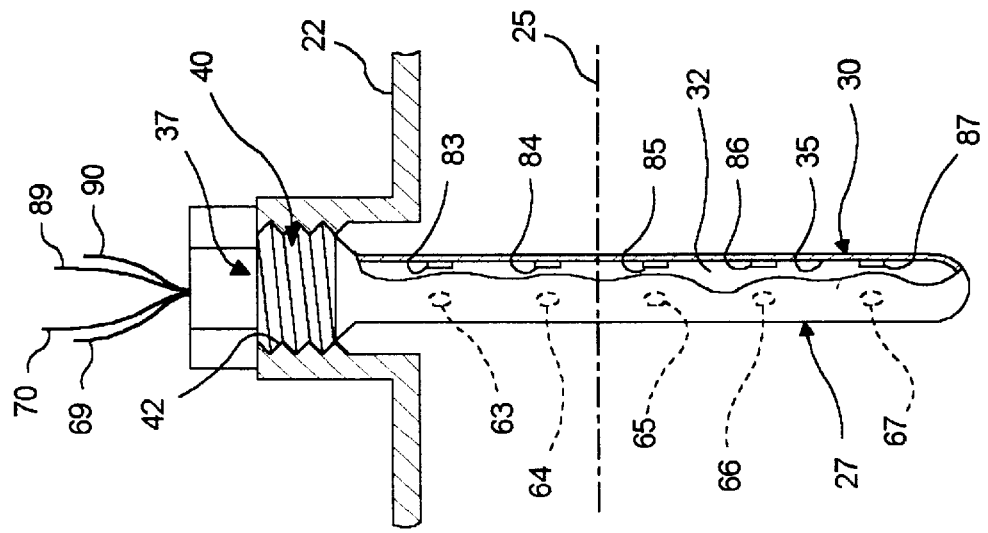
FIG. 2 is an enlarged elevation view of the internal liquid level detector system of FIG. 1 with portions of the housing broken away to show the heater and sensors.

The internal liquid level detector 20 of the present invention advantageously uses the thermodynamic characteristics of a liquid and vapor mixture in thermodynamic equilibrium contained in a closed vessel 22 under pressure. More specifically, in a closed vessel containing liquid and vapor at its equilibrium temperature and pressure, the liquid and vapor are normally at equilibrium. When heat is applied to a selected volume of liquid in the vessel, the liquid vaporizes or circulates, thereby removing or absorbing a considerable amount of heat from the heat source. The heat so absorbed is liberated throughout the system. By this mechanism, large amounts of heat may be removed at a relatively constant rate. It has also been found that the temperature does not rise appreciably as long as the vessel is sufficiently large that the total surface of the vessel can easily dissipate the heat added at the point source, which is in practice extremely small, i.e., a few watts. Provided there is liquid adjacent the heat source, the temperature at the heat source remains relatively constant. Under these conditions, neither the overall temperature of the system nor its pressure rise significantly. Alternatively, when heat is applied to an area of the vessel not covered by liquid, the heat in the area increases as sensible heat causing a temperature increase which is readily detectable and markedly different in magnitude from an area covered by liquid.

Accordingly, upon applying heat to a selected area or volume of liquid in the vessel for a relatively short period of time, the liquid acts as a refrigerant, lessening the temperature rise to generally within a range of one (1) to five (5) degrees. If the vessel contains propane at equilibrium with its vapor, a several degree increase in temperature causes it to vaporize like a refrigerant, efficiently carrying the heat away.

If, however, the upper surface of the liquid is below the heat source so that vapor is adjacent to the heat source, then the temperature of the adjacent vapor rises generally greater than about ten (10) degrees, up to about forty (40) degrees or more, depending upon the heat density applied and energy being added in watts. The temperature rise associated with vapor may be two (2) to four (4) times the temperature rise associated with liquid. The contrasting temperature rises result from the vapor being less effective, as compared to the liquid, at removing the heat added by the heat source, i.e., the liquid is a more effective coolant relative to the vapor.

Figure 1:
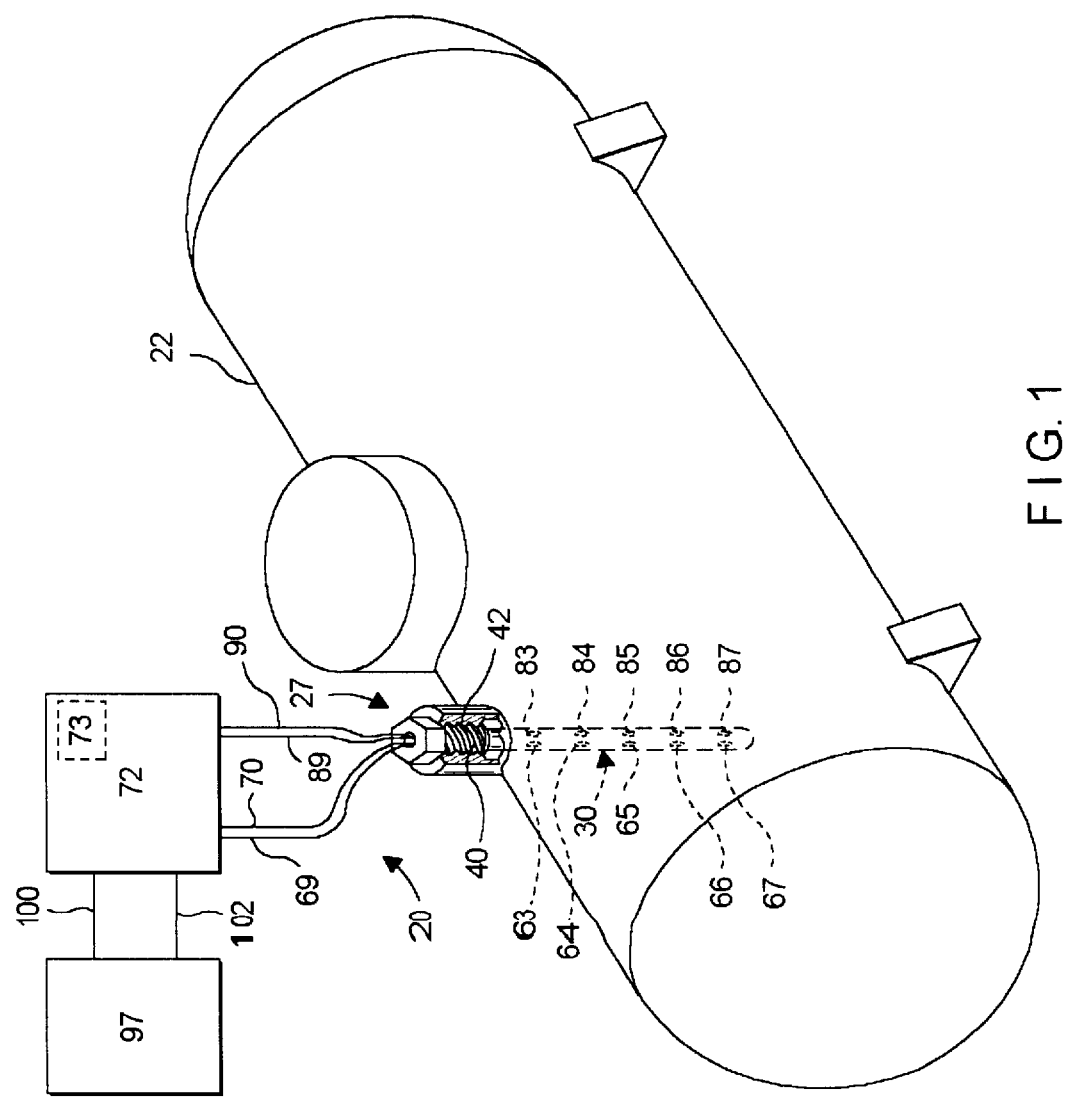
FIG. 1 is a perspective view of an internal liquid level detector system of the present invention mounted within a storage vessel.

Referring to the drawings and more particularly to FIG. 1, the internal liquid level detector system 20 is shown mounted within a storage vessel 22 for detecting the elevation of the upper surface 25 of a fluid, such as propane, contained in the vessel. The vessel 22 may be a horizontally or vertically disposed propane tank such as is shown in FIG. 1 having a usual capacity in the range of approximately 20 to 20,000 gallons.

As shown in FIGS. 1 and 2, the system 20 comprises a detector assembly 27 including an elongate thermally conductive substrate which may be constituted by a tubular housing 30 formed of metal such as copper, steel or aluminum. The tubular housing 30 has a longitudinal interior passage 32 bounded longitudinally by an inner surface 35.

The detector assembly 27 also includes a means 37 for supporting the substrate within the vessel 22 such that the substrate has portions with different elevations. One preferable embodiment of the housing 30 has an externally threaded upper end 40 which is screwed into corresponding internal threads of a port 42 in the upper surface of the vessel 22. The threaded end and port 40, 42 thereby constitute a preferred embodiment of the support means 37. The threaded engagement between the upper end 40 and port 42 is sufficiently tight to prevent leakage through the engagement of the vapor and liquid in the vessel.

The portion of the housing 30 below the threaded end 40 has a diameter which is less than that of the port 42 to facilitate insertion of the housing 30 from above the vessel 22 downward through the port 42.

Figure 3:
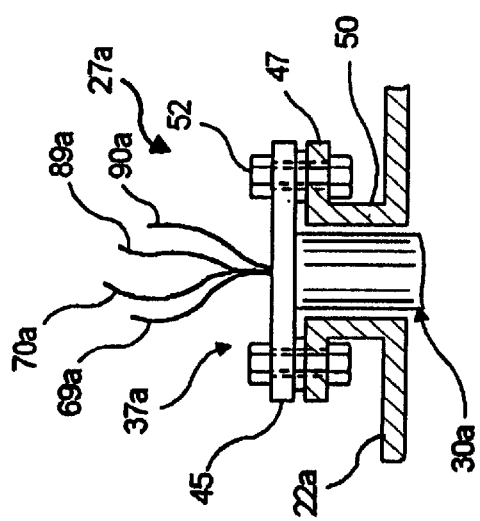
FIG. 3 is an elevation view of a second embodiment of the system shown in FIG. 1 illustrating the connection between the detector assembly and the vessel.

An alternative embodiment of the support means 37a is shown in FIG. 3. FIG. 3 is a view corresponding to FIG. 2, such that parts in FIG. 3 corresponding to parts in FIG. 2 have the same reference numeral with the addition of the suffix a. FIG. 3 illustrates an alternative embodiment of the detector assembly 27a including a housing 30a which is preferably tubular and has an annular flange 45 fixed to, and preferably integral with, the adjoining depending portion. The flange 45 has a plurality of holes which align with corresponding holes in an annular flange 47 which is vertically offset from the upper surface of the vessel 22a by a tubular neck 50. The flange 47 is fixed to the neck 50 which in turn is fixed to the vessel 22a by, for example, welding or casting, the latter resulting in an integral structure.

Alignment of the respective holes in the flanges 45, 47 enables respective bolts 52 to be inserted through them as shown in FIG. 3. The offset of the flange 47 from the vessel 22a provided by the neck 50 enables application of respective nuts to each of the bolts 52 to provide for clamping together of the flanges 45, 47. The housing 30a is thereby supported in the vessel 22a.

Figure 4:
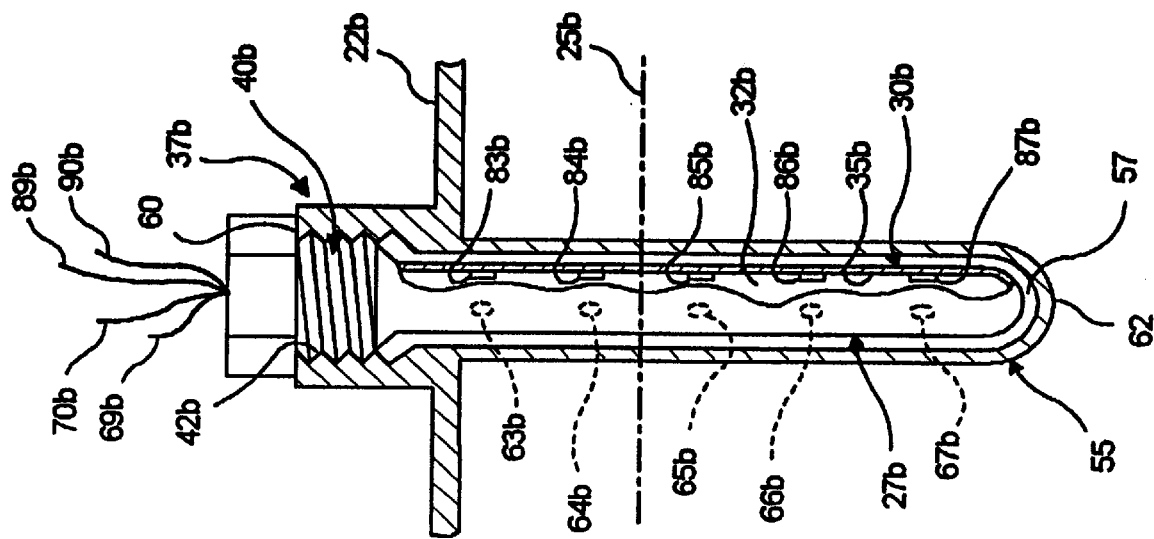
FIG. 4 is an elevation view of a third embodiment of the system shown in FIG. 1 illustrating the detector assembly supported in a well formed in the vessel.

A second alternative embodiment of the support means 37b is shown in FIG. 4. FIG. 4 is a view corresponding to FIG. 2, such that parts in FIG. 4 corresponding to parts in FIG. 2 have the same reference numeral with the addition of the suffix b. FIG. 4 illustrates an alternative embodiment of the detector assembly 27b including an elongate well 55 having a longitudinal interior chamber 57. The chamber 57 is accessible through the port 42b which extends through the proximal end 60 of the well 55. The well 55 has a distal end 62 at which the chamber 57 is closed. The well 55 is constructed for anchoring to the inner surface of the top of the vessel 22b in depending relation thereto. The well 55 is further constructed such that the anchoring provides access to the chamber 57 via the port 60 from outside of the vessel 22b and obstructs access to the chamber from inside of the vessel.

The chamber 57 is sized to receive the housing 30b in suitable thermal coupling thereby providing the depending relation support to the housing. Thermal coupling is provided between the housing 30b and well 55 by sizing the chamber 57 to conform generally to and be slightly larger than the external volume of the housing 30b such that, when the housing is inserted into the chamber, there is a no more than a slight clearance between the housing and well. Occupation of this clearance by a thermal intermediary enhances the thermal coupling. Such a thermal intermediary may be provided by a conductive paste, applied to the outer surface of the housing 30b before insertion thereof into the chamber 57, remaining on the outer surface after the housing is inserted into the chamber.

Thermal coupling between the housing 30b and well 55 may also be mechanically enhanced by reducing the clearance between them, such as by providing the outer surface of the housing 30b with an oval-shaped cross-section and the chamber 57 with a circular cross-section. When such an oval-shaped housing 30b, disposed in such a circular-shaped chamber 57 as shown in FIG. 4, is heated, the housing will expand into the chamber thereby reducing the clearance between the housing and well 55.

The support means 37b illustrated in FIG. 4 facilitates repair and retrofit of the housing 30b because the support means enables the housing to be removed from and inserted into the vessel 22b without opening the vessel to expose its interior directly to the atmosphere. Nevertheless, the support means 37b is a less preferable embodiment than the support means 37, 37a shown in FIGS. 2 and 3.

Referring to FIG. 2, one or more heaters 63, 64, 65, 66, 67 are mounted on the housing 30 such that the heaters are each thermally coupled to the contents in the interior of the vessel 22 in which liquid and vapor is contained. The location of the heaters 63, 64, 65, 66, 67 on the housing 30 is such that, when the housing is supported in the vessel 22, the heaters have different elevations. The vertical distances between adjacent pairs of heaters 63, 64, 65, 66, 67 may be the same, as illustrated in FIG. 2.

In FIG. 2, the heaters 63, 64, 65, 66, 67 are illustrated as respective point sources fixed to the inner surface 35 of the tubular housing 30 by epoxy.

Alternatively, the heaters 63, 64, 65, 66, 67 may be held within the interior passage 32 of the housing 30 by potting compound. In each of these embodiments, the heaters 63, 64, 65, 66, 67 are not exposed directly to the liquid or vapor within the vessel 22.

Figure 5:
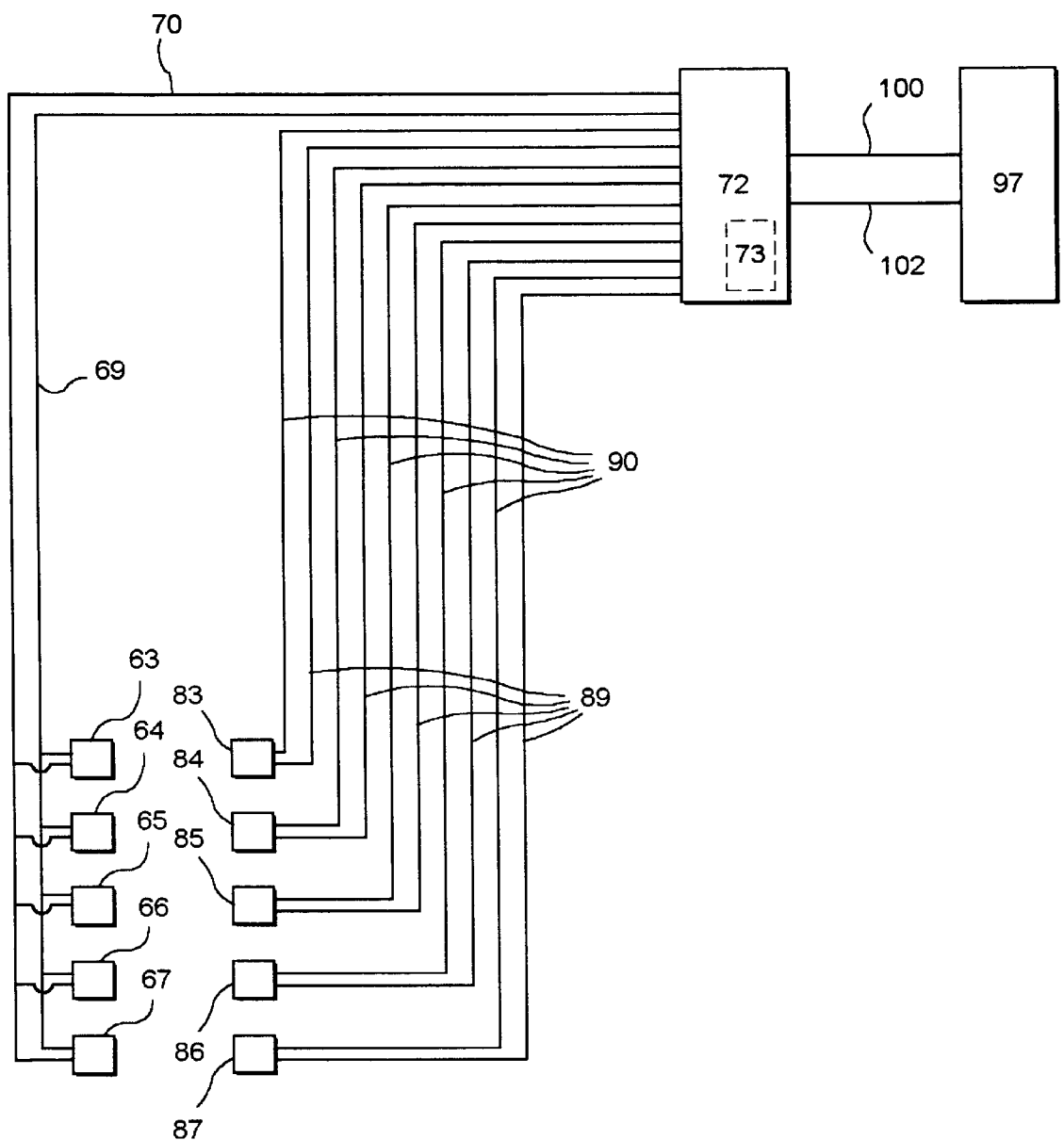
FIG. 5 is a schematic diagram showing the electrical conduits for connecting the sensors, power supply, processor and interface of FIG. 1.

Electrical conduits 69, 70 extend from each of the heaters 63, 64, 65, 66, 67 through the interior passage 32 of the housing 30 upwardly through the upper end 40. FIGS. 1 to 4 represent the conduits 69, 70, 69a, 70a, 69b, 70b schematically in that each of the heaters 63, 64, 65, 66, 67 has a respective pair of conduits 69, 70, as shown in FIG. 5. The circuitry of the conduits 69, 70 may differ from that shown in FIG. 5. Each pair of the conduits 69, 70 are electrically connected to an electrical processor 72. The conduits 69, 70 may each comprise one or more wires.

The processor 72 includes a power supply 73 for supplying electricity to the heaters 63, 64, 65, 66, 67. Accordingly, one of the conduits, e.g., 69, is designated for providing electricity from the power supply 73 to the respective heaters 63, 64, 65, 66, 67 for actuation thereof. The other of the conduits, e.g., 70, provides the electrical signal from the processor 72 to the heaters 63, 64, 65, 66, 67 for controlling the respective actuations thereof.

One or more sensors 83, 84, 85, 86, 87 are mounted on the inner surface 35 of the housing 30 in thermally coupled proximity to the heaters 63, 64, 65, 66, 67. Each of the sensors 83, 84, 85, 86, 87 is thermally coupled, through the thermally conductive housing 30, to the interior of the vessel 22 to detect the temperature therein in proximity to the respective sensor. The location of the sensor(s) 83, 84, 85, 86, 87 on the housing 30 is such that, when the housing is supported in the vessel 22, the elevation of each sensor corresponds to the elevation of a respective one of the heaters 63, 64, 65, 66, 67.

The sensors 83, 84, 85, 86, 87 are thermally affixed to the inner surface 35 such as, for example, by epoxy or a rubber encapsulate. Alternatively, the sensors 83, 84, 85, 86, 87 may be held within the interior passage 32 of the housing 30 by potting compound. The potting compound may completely fill the interior passage 32. In a further alternative embodiment, the sensors 83, 84, 85, 86, 87 and associated heaters 63, 64, 65, 66, 67 may be attached to the housing 30 by inserting the sensors and heaters into the interior passage 32 of the housing 30 and, subsequently, drawing the tubular housing (i.e., to apply radial compression to the housing) so to substantially collapse the interior passage 32 around the sensors and heaters. Neither the sensors 83, 84, 85, 86, 87 nor the heaters 63, 64, 65, 66, 67 are exposed directly to the liquid or vapor within the vessel 22. Mountings of the sensors 83, 84, 85, 86, 87 and associated heaters 63, 64, 65, 66, 67 on the inner surface 35 which increase thermal coupling, rigidity and ruggedness are preferred.

In a further alternative embodiment, the housing 30 may be flexible. Attachment of the sensors 83, 84, 85, 86, 87 and associated heaters 63, 64, 65, 66, 67 to a flexible housing 30 may be accomplished by placing the heaters and sensors in a trough with potting such that the potting would encapsulate the sensors and heaters. The potting could be exposed directly to environment of interior of vessel 22 as long as the sensors 83, 84, 85, 86, 87 and associated heaters 63, 64, 65, 66, 67 were shielded therefrom by the potting.

Each of the sensors 83, 84, 85, 86, 87 has respective electrical conduits 89, 90 extending through the interior passage 32 of the housing 30 upwardly through the upper end 40. FIGS. 1 to 4 represent the conduits 89, 90, 89a, 90a, 89b, 90b schematically in that each of the sensors 83, 84, 85, 86, 87 has a respective pair of conduits 89, 90, as shown in FIG. 5. The circuitry of the conduits 89, 90 may differ from that shown in FIG. 5. The conduits 89, 90 are electrically connected to the processor 72. The conduits 89, 90 may each comprise one or more wires.

The sensors 83, 84, 85, 86, 87 are each supplied with electricity from the power supply 73 through one of the conduits, e.g., 89. The sensors 83, 84, 85, 86, 87 thereby generate respective electrical signals defining temperature signals indicative of the temperature detected by the corresponding sensor. The respective temperature signals from the various sensors 83, 84, 85, 86, 87 are provided to the processor 72 by the other of the conduits, e.g., 90. The processor 72 may interrogate the sensors 83, 84, 85, 86, 87 simultaneously or sequentially.

The processor 72 is programmed to calculate a "temperature index" proportional to each of the temperature signals received the sensors 83, 84, 85, 86, 87. Each temperature index is associated with a respective sensor, e.g., 85, and indicates the temperature increase detected by the sensor resulting from actuation of the associated heater, e.g., 65. This, in turn, indicates the presence of liquid or vapor adjacent to the sensor, e.g., 85, because the presence of liquid results in a lower temperature increase as compared to the temperature increase if vapor is present.

The processor 72 is programmed further to compare each the temperature index to a "reference" and to generate an electrical signal defining an elevation signal indicative of the liquid upper surface 25 being either above or below the sensor, e.g., 85.

The processor 72 may be programmed to determine the temperature index by various methods, each based on the temperature signal received from the one or more sensors 83, 84, 85, 86, 87. The processor 72 is programmed further such that the reference corresponds to the temperature index. Each of these methods involves the processor 72 interrogating, measuring and interpreting the temperature signals from the respective sensors 83, 84, 85, 86, 87.

For example, the temperature index may be the temperature detected by one or more of the sensors, e.g., 85, at a specific time after actuation of the associated heater, e.g., 65. A corresponding reference may be the temperature which is known to be the maximum temperature which would be detected by the sensor, e.g., 85, if liquid is present at the elevation of the sensor. Such a reference temperature may be determined, for example, empirically prior to operation of the system 20 to determine an unknown liquid level. If the temperature detected by the sensor, e.g., 85, is less than the reference temperature, then the processor 72 determines that liquid is present at the elevation of the sensor. If the temperature detected by the sensor, e.g., 85, is greater than the reference temperature, then the processor 72 determines that vapor is present at the elevation of the sensor.

Alternatively, the reference temperature may determined during operation of the system 20 to determine an unknown liquid level. For example, the reference temperature may be determined by ascertaining the temperatures detected by additional sensors located at elevations within the vessel 22 which are known to have liquid and vapor, respectively, thereby to determine reference "liquid" and "vapor" temperatures. If the temperature detected by the sensor, e.g., 85, after heat is applied by the heater, e.g., 65, is sufficiently close to the reference "liquid" temperature, then the processor 72 determines that liquid is present at the elevation of the sensor. If the temperature detected by the sensor, e.g., 85, is sufficiently close to the reference "vapor" temperature, then the processor 72 determines that vapor is present at the elevation of the sensor.

Alternatively, the temperature index may be the change in the temperatures detected by one or more of the sensors, e.g., 85, between two specific times, such as the time just before actuation of one or more of the heaters, e.g., 65, and a specific time after actuation of the heater. A corresponding reference may be the temperature change which is known to be the maximum increase which would be detected by the sensor, e.g., 85, if liquid is present at the elevation of the sensor. Such a reference change may be determined, for example, empirically prior to operation of the system 20 to determine an unknown liquid level. If the change in temperatures detected by the sensor, e.g., 85, is less than the reference change, then the processor 72 determines that liquid is present at the elevation of the sensor. If the change in temperatures detected by the sensor, e.g., 85, is greater than the reference change, then the processor 72 determines that vapor is present at the elevation of the sensor.

Alternatively, the reference change may determined during operation of the system 20 to determine an unknown liquid level. For example, the reference change may be determined by ascertaining the changes in temperatures detected by additional sensors located at elevations within the vessel 22 which are known to have liquid and vapor, respectively, thereby to determine reference "liquid" and "vapor" changes. If the temperature change detected by the sensor, e.g., 85, is sufficiently close to the reference "liquid" change, then the processor 72 determines that liquid is present at the elevation of the sensor. If the temperature detected by the sensor, e.g., 85, is sufficiently close to the reference "vapor" change, then the processor 72 determines that vapor is present at the elevation of the sensor.

A further alternative is for the temperature index to be the rate of change in temperature detected by one or more of the sensors, e.g., 85, relative to a specific time period after actuation of the associated heater, e.g., 65. A corresponding reference may be the temperature change rate which is known to be the maximum which would be detected by the sensor, e.g., 85, if liquid is present at the elevation of the sensor. Such a reference change rate may be determined, for example, empirically prior to operation of the system 20 to determine an unknown liquid level. If the rate of change in temperatures detected by the sensor, e.g., 85, is less than the reference change rate, then the processor 72 determines that liquid is present at the elevation of the sensor. If the rate of change in temperatures detected by the sensor, e.g., 85, is greater than the reference change rate, then the processor 72 determines that vapor is present at the elevation of the sensor.

Alternatively, the reference change rate may determined during operation of the system 20 to determine an unknown liquid level. For example, the reference change rate may be determined by ascertaining the rates of change in temperatures detected by additional sensors located at elevations within the vessel 22 which are known to have liquid and vapor, respectively, thereby to determine reference "liquid" and "vapor" change rates. If the rate of change in temperature detected by the sensor, e.g., 85, is sufficiently close to the reference "liquid" change rate, then the processor 72 determines that liquid is present at the elevation of the sensor. If the rate of change in temperature detected by the sensor, e.g., 85, is sufficiently close to the reference "vapor" change rate, then the processor 72 determines that vapor is present at the elevation of the sensor.

The one or more time periods during which the temperature change rate for one or more of the sensors, e.g., 85, is determined may be sufficiently close in time to the actuation of the associated heater, e.g., 65, so that the change rate indicates a relatively fast increase in the temperature for the vapor and a relatively slow increase in the temperature for the liquid.

Alternatively, the one or more time periods during which the temperature change rate for one or more of the sensors, e.g., 85, is determined may be sufficiently after the actuation of the associated heater, e.g., 65, so that the change rate indicates a relatively fast decrease in the temperature for vapor and a relatively slow decrease in the temperature for liquid. The reference change rate is determined so as to account for the proximity in time of the determination of the temperature change rate for one or more of the sensors, e.g., 85, to the actuation of the associated heater, e.g., 65.

The system 20 includes an interface 97 electrically connected by electrical conduits 100, 102 to the processor 72. The electrical conduits 100, 102 may comprise one or more wires. One of the conduits, e.g., 100, provides for transmission of the one or more elevation signals from the processor 72 to the interface 97. The interface 97 uses the elevation signals as the basis for communicating to the user the relative elevation of the liquid upper surface 25 as being either above or below the selected sensor, e.g., the sensor 85. The other of the conduits, e.g., 102, provides for supply of electricity from the power supply 73 to the interface 97.

A preferable method for operating the system 20 in order to detect the elevation of the liquid upper surface 25 in the vessel 22 includes actuating one or more of the heaters, e.g., 65, to add heat to the outer surface of the housing 30 in the vessel.

The temperature in the vessel 22 is then detected by each of the sensors, e.g., 85, having the elevation corresponding to the elevation of the heater, e.g., 65, which is actuated. The temperature is detected by the sensor, e.g., 85, after the increase in the temperature caused by the heater, e.g., 65. The selected sensor, e.g., 85, generates a temperature signal indicative of the temperature in the vessel 22 at the sensor. The temperature signal is then transmitted from the sensor, e.g., 85, to the processor 72.

The processor 72 is constructed so as to operate to calculate the difference between the temperature signal and the reference temperature. If the magnitude of the difference is less than a standard, the processor 72 generates an electrical signal defining a high signal indicating that the liquid upper surface 25 is above the sensor, e.g., 85. The processor 72 then transmits the high signal to the interface 97 by the conduit 100. If the magnitude of the difference is greater than the standard, the processor 72 generates an electrical signal defining a low signal indicating that the liquid upper surface 25 is below the sensor, e.g., 85. The processor 72 then transmits the low signal to the interface 97 by conduit 100.

The interface 97, based on receipt of either the high or low signal, communicates to the user the relative elevation of the liquid upper surface 25 as either above or below the sensor, e.g., 85.

In a preferred embodiment, the reference temperature may be the temperature in the vessel 22 just prior to actuation of the heater, e.g., 65. More specifically, the temperature signal received by the processor 72 after actuation of the heater, e.g., 65, may define a subsequent signal. One or more of the sensors, e.g., 85, detects the temperature in the vessel 22 before actuation of the heater, e.g., 65. The sensor, e.g., 85, generates a temperature signal defining an initial signal indicative of the temperature in the vessel 22 before actuation of the heater, e.g., 65. The initial signal is then transmitted from the sensor, e.g., 85, to the processor 72 which assigns the initial signal as the reference temperature.

The initial signal is a suitable reference temperature because it is indicative of the temperature in the vessel 22 adjacent to the selected sensor, e.g., 85, just prior to actuation of the heater, e.g., 65. After actuation of the heater, e.g., 65, the increase in the temperature adjacent to the selected sensor, e.g., 85, relative to the initial signal, will indicate the elevation of the liquid upper surface 25 relative to the selected sensor, e.g., 85. If the temperature increase is small, then the selected sensor, e.g., 85, is adjacent to liquid and the elevation of the liquid upper surface 25 is above the sensor. If the temperature increase is large, then the selected sensor, e.g., 85, is adjacent to vapor and the elevation of the liquid upper surface 25 is below the sensor.

The system 20 may be operated to detect more than one elevation of the liquid upper surface 25 by using the plurality of sensors 83, 84, 85, 86, 87. More specifically, the sensors 83, 84, 85, 86, 87 are spaced along longitudinal axis of the housing 30. Accordingly, when the housing 30 is mounted in the vessel 22 as shown in FIG. 1, each of the sensors 83, 84, 85, 86, 87 has a different elevation.

The elevation of the liquid upper surface 25 with respect to the sensors 83, 84, 85, 86, 87 may be determined by performing the procedure disclosed herein above on one or more of the sensors. Preferably, the sensors 83, 84, 85, 86, 87 are each operated in conjunction with the respective heater 63, 64, 65, 66, 67 having the same elevation. For example, the temperature detection by the sensor 84 following actuation of the heater preferably follows actuation of the heater 64.

The processor 72 may obtain the temperature signals from the sensors 83, 84, 85, 86, 87 according to various sequences. For example, the processor 72 may first obtain the temperature signal from the sensor 83 and determine whether the liquid upper surface 25 is above the sensor 83. If so, the liquid upper surface 25 is known to be above the other sensors 84, 85, 86, 87 since they are all below the sensor 83. The processor 72 then transmits an elevation signal to the interface 97 indicating that the liquid upper surface 25 is above the sensor 83. The processor 72 need not obtain the temperature signals the other sensors 84, 85, 86, 87 since they all have a lower elevation than the sensor 83.

If the processor 72 determines from the temperature signal from the sensor 83 that the liquid upper surface 25 is below the sensor 83, then the processor obtains the temperature signal from the sensor 84 having the elevation next below the elevation of the sensor 83. If the processor determines that the liquid upper surface 25 is above the sensor 84, then the processor transmits an elevation signal to the interface 97 indicating that the elevation of the liquid upper surface is between the respective elevations of the sensors 83 and 84.

If the processor 72 determines from the temperature signal from the sensor 84 that the liquid upper surface 25 is below the sensor 84, then the processor continues to obtain the temperature signals from the sensors in descending order 85, 86, 87 until a sensor is located which the liquid upper surface 25 is above. Upon identification by the processor 72 of such a sensor, the processor transmits an elevation signal to the interface 97 indicating that the elevation of the liquid upper surface 25 is between the respective elevations of the identified sensor and the sensor next above. If the processor 72 determines that the liquid upper surface 25 is below the sensor 87, then the processor transmits an elevation signal to the interface 97 indicating that the elevation of the liquid upper surface 25 is below the sensor 87. This procedure is referred to herein as the "top-down" method.

Each of the sensors 83, 84, 85, 86, 87 has a known longitudinal distance from a longitudinal reference on the housing 30, such as the upper end 40. The elevation of the longitudinal reference, e.g., the upper end 40, relative to the upper and lower surfaces of the vessel 22 is fixed and may be determined. Accordingly, by determining the elevation of the liquid upper surface 25 relative to the sensors 83, 84, 85, 86, 87 the elevation of the liquid upper surface relative to the upper and lower surfaces of the vessel 22 may be determined.

An alternative procedure for determining the elevation of the liquid upper surface 25 relative to the sensors 83, 84, 85, 86, 87 includes the processor 72 obtaining the temperature signals in a different sequence as compared the top-down method disclosed herein above. More specifically, the processor 72 first obtains the temperature signal from the sensor 87 and determining whether the elevation of the liquid upper surface 25 is below the sensor 87. If so, the liquid upper surface 25 is known to be below the other sensors 83, 84, 85, 86 since they are all above the sensor 87. The processor 72 then transmits an elevation signal to the interface 97 indicating that the liquid upper surface 25 is below the sensor 87. The processor 72 need not obtain the temperature signals from the other sensors 83, 84, 85, 86 since they all have a higher elevation than the sensor 87.

If the processor 72 determines from the temperature signal from the sensor 87 that the liquid upper surface 25 is above the sensor 87, then the processor obtains the temperature signals from the sensors 86, 85, 84, 83 in ascending order until a sensor is identified which has an elevation above the liquid upper surface in a manner similar to the top-down method disclosed herein above. This procedure is referred to herein as the "bottom-up" method.

The procedures disclosed herein may also be used for liquid level detector systems in which the heaters 63, 64, 65, 66, 67 and sensors 83, 84, 85, 86, 87 are attached to the outer surface of the vessel 22. An example of such a liquid level detector system is disclosed in U.S. patent application Ser. No. 09/368,337, filed Aug. 3, 1999. In such a liquid level detector system, the substrate 30 of the present invention is constituted by a portion of the vessel 22.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A system for detecting the level of a liquid in a vessel, comprising:
   a detector assembly including
      a thermally conductive substrate;
      means for supporting said substrate within the vessel,
      a heater mounted on said substrate within the vessel such that said heater is thermally coupled to the interior of the vessel, said heater being able to be actuated to add heat to the surface of the substrate thermally coupled to the interior of the vessel, and
      a sensor mounted on said substrate within the vessel in proximity to said heater, said sensor being thermally coupled to the interior of the vessel to detect the temperature therein in proximity to said sensor, said sensor being able to be actuated to generate an electrical signal defining a temperature signal indicative of said detected temperature;
   a processor electrically connected to said sensor for receiving said temperature signal after actuation of said heater, said processor being programmed to calculate a temperature index proportional to said temperature signal, said processor being further programmed to compare said temperature index to a reference thereby to generate an electrical signal defining an elevation signal indicative of the elevation of the upper surface of the liquid being either above or below said sensor;
   an interface electrically connected to said processor for receiving said elevation signal for use as the basis for communicating to the user the relative elevation of the liquid upper surface as either above or below said sensor;
   a power supply electrically connected to said heater, sensor, processor, and interface;
   a fixture for supporting said substrate in depending relation relative to the upper inner surface of the vessel, said fixture being constructed for connection to the upper portion of the vessel, said fixture being constructed for receiving said substrate for said depending relation support; and
   wherein said fixture comprises an elongated well having a longitudinal interior chamber, said chamber being accessible through a port which extends through a proximal end of said well, said well having a distal end at which said chamber is closed, said well being constructed for anchoring to the inner surface of the top of the vessel in depending relation thereto, said well being further constructed such that said anchoring provides access to said chamber via said port from outside of the vessel and obstructs access to said chamber from inside of the vessel, said chamber being sized to receive said substrate to provide said depending relation support to said substrate, said substrate being thermally coupled to said well.

2. A system as set forth in claim 1, wherein said substrate is elongate and has a longitudinal axis, said support means orienting said substrate such that said longitudinal axis is non-horizontal.

3. A system as set forth in claim 2, wherein said longitudinal axis of said substrate is vertical.

4. A system as set forth in claim 1, wherein said substrate contains an longitudinal chamber, said chamber having an interior accessible through a port formed in a proximal end of said substrate, said substrate having a distal end at which said chamber is closed, said sensor and heater being mounted within said interior of said substrate.

5. A system as set forth in claim 1, wherein said heater is defined by a plurality of heaters each mounted on said substrate such that said support of said substrate in the vessel results in said heaters each having different elevations within the vessel, said sensor being defined by a plurality of sensors each mounted on said substrate in proximity to said heater such that said support of said substrate in the vessel results in each of said sensors each the same elevation within the vessel as an associated one of said heaters, said heaters and sensors each being thermally coupled to the interior of the vessel to add heat and detect the temperature in proximity to said heaters and sensors, respectively, said sensors each being able to be actuated to generate an electrical signal defining a respective temperature signal indicative of said detected temperature, said sensors each being electrically connected to said processor thereby to identify which of said sensors are below the elevation of the liquid upper surface and to further identify the sensors which are above the elevation of the liquid upper surface, thereby to determine the position of the liquid upper surface relative to said sensors.

6. A system as set forth in claim 1, wherein said processor comprises an electronic microprocessor.

7. A method for detecting the level of a liquid in a vessel, comprising the steps of:
actuating a heater mounted on a thermally conductive substrate mounted within the vessel, said actuation adding heat to the surface of the substrate thermally coupled to the interior of the vessel;
detecting by a sensor the temperature in the vessel after said addition of heat, the sensor being mounted on the substrate within the vessel in proximity to the heater, the sensor generating an electrical signal indicative of the temperature, said electrical signal defining a temperature signal;
transmitting the temperature signal from the sensor to a processor wherein the temperature signal received by the processor after actuation of the heater is defined by a subsequent signal,
detecting by the sensor the temperature in the vessel before said addition of heat, the sensor being in proximity to the heater, the sensor generating an electrical signal defined by an initial temperature signal indicative of the temperature before said addition of heat, and
transmitting the initial temperature signal from the sensor to the processor, said reference temperature in said step of operating the processor being defined by the initial temperature signal; and operating the processor to
calculate the difference between the temperature signal and a reference temperature,
generate an electrical signal defining a high signal indicating that the elevation of the upper surface of the liquid is above the sensor if the magnitude of the difference is less than a standard, and transmit the high signal to an interface electrically connected to the processor,
generate an electrical signal defining a low signal indicating that the elevation of the liquid upper surface is below the sensor if the magnitude of the difference is greater than the standard, and transmit the low signal to the interface;
communicating by the interface to the user the relative elevation of the liquid upper surface as either above or below the sensor based on receipt of either the high or low signal.

8. A method as set forth in claim 7, wherein the sensor is defined by an upper sensor, the temperature signal being defined by an upper signal, the difference being defined by an upper difference,
said detecting step comprising the further step of detecting the temperature in the vessel by a lower sensor having an elevation below the elevation of the upper sensor, the lower sensor being mounted on the substrate within the vessel in proximity to the heater, the lower sensor generating an electrical temperature signal indicative of the temperature,
said step of transmitting the upper temperature signal further comprising the step of transmitting from the lower sensor an electrical lower temperature signal indicating the temperature detected by the lower sensor, the lower temperature signal being received by the processor,
said step of operating the processor comprising the further step of calculating the difference between the lower temperature signal and the reference energy thereby to define a lower difference,
said step of operating the processor to generate the low signal being defined by
generating an electrical signal defining an intermediate signal indicating that the elevation of the liquid upper surface is between the upper and lower sensors if the magnitude of the lower difference is less than the standard, and transmitting the intermediate signal to the interface, and
generating an electrical low signal indicating that the elevation of the liquid upper surface is below the lower sensor if the magnitude of the lower difference is greater than the standard, and transmitting the low signal to the interface,
said step of communicating to the user further comprising communicating by the interface the elevation of the liquid upper level as either between the upper and lower sensors or below the lower sensor based on receipt of either the intermediate or low signal.

9. A system for detecting the level of a liquid in a vessel, comprising:
a detector assembly including
a thermally conductive substrate;
means for supporting said substrate within the vessel,
a heater mounted on said substrate within the vessel such that said heater is thermally coupled to the interior of the vessel, said heater being able to be actuated to add heat to the surface of the substrate thermally coupled to the interior of the vessel, and a sensor mounted on said substrate within the vessel in proximity to said heater, said sensor being thermally coupled to the interior of the vessel to detect the temperature therein in proximity to said sensor, said sensor being able to be actuated to generate an electrical signal defining a temperature signal indicative of said detected temperature;

a processor electrically connected to said sensor for receiving said temperature signal after actuation of said heater, said processor being programmed to calculate a temperature index proportional to said temperature signal, said processor being further programmed to compare said temperature index to a reference thereby to generate an electrical signal defining an elevation signal indicative of the elevation of the upper surface of the liquid being either above or below said sensor;

an interface electrically connected to said processor for receiving said elevation signal for use as the basis for communicating to the user the relative elevation of the liquid upper surface as either above or below said sensor;

a power supply electrically connected to said heater, sensor, processor, and interface; and wherein said processor also receives said temperature signal prior to the actuation of said heater, said processor being programmed to calculate a temperature index proportional to both said temperature signals prior to and after actuation of said heater.

10. A system as set forth in claim 9, wherein said processor is programmed to make said temperature index equal to said detected temperature after a specific time period following actuation of said heater, said processor being further programmed to make said reference equal to the maximum temperature which would be detected by said sensor if liquid was in close thermal proximity to said sensor, said processor being further programmed to compare said temperature index to said reference and determine that liquid is in said close thermal proximity if said temperature index is less than said reference, said processor being further programmed to determine that vapor is in said close thermal proximity if said temperature index is greater than said reference.

11. A system as set forth in claim 9, wherein said processor is programmed to make said temperature index equal to the difference between said detected temperature just before actuation of said heater and said detected temperature after a specific time period following actuation of said heater, said processor being further programmed to make said reference equal to the maximum temperature difference which would be detected by said sensor if liquid was in close thermal proximity to said sensor, said processor being further programmed to compare said temperature index to said reference and determine that liquid is in said close thermal proximity if said temperature index is less than said reference, said processor being further programmed to determine that vapor is in said close thermal proximity if said temperature index is greater than said reference.

12. A system as set forth in claim 9, wherein said processor is programmed to make said temperature index equal to a rate defined by the difference between said detected temperature just before actuation of said heater and said detected temperature after a specific time period following actuation of said heater divided by the time period between said detection of said detected temperatures, said processor being further programmed to make said reference equal to the maximum rate which would be calculated by said processor if liquid was in close thermal proximity to said sensor, said processor being further programmed to compare said temperature index to said reference and determine that liquid is in said close thermal proximity if said temperature index is less than said reference, said processor being further programmed to determine that vapor is in said close thermal proximity if said temperature index is greater than said reference.

* * * * *